United States Patent [19]

Ranko et al.

[11] 4,112,656
[45] Sep. 12, 1978

[54] LAWN MOWING BRUSH CUTTER

[76] Inventors: Jerry Ranko, 504 Reiss St., Meraux, La. 70043; Frederick E. Ranko, 2709 Barton Dr., Meraux, La. 70075

[21] Appl. No.: 760,596

[22] Filed: Jan. 19, 1977

Related U.S. Application Data

[63] Continuation-in-part of Ser. No. 645,777, Dec. 31, 1975, abandoned.

[51] Int. Cl.² ............................................. A01D 55/18
[52] U.S. Cl. .................................... 56/320.1; 56/16.9; 56/295
[58] Field of Search .................... 56/320.1, 320.2, 255, 56/295, 503, 16.7, 16.9, 17.5, 233–235

[56] References Cited

U.S. PATENT DOCUMENTS

| | | | |
|---|---|---|---|
| 2,659,191 | 11/1953 | Miller et al. | 56/320.1 |
| 2,708,818 | 5/1955 | Gentry et al. | 56/320.1 |
| 3,496,707 | 2/1970 | Kobey | 56/320.2 |

FOREIGN PATENT DOCUMENTS

| | | | |
|---|---|---|---|
| 173,844 | 1/1922 | United Kingdom | 56/320.1 |

Primary Examiner—Jay N. Eskovitz
Attorney, Agent, or Firm—James B. Lake, Jr.

[57] ABSTRACT

A power driven circular saw blade for cutting brush is extensible with scythe tips mountable diametrically thereon for cutting grass. The saw blade is horizontally mounted in a recess defined between forwardly extending sides of a wheeled cart, the sides acting as brush guides and stabilizing against a directional pull generated by the rotation of the saw blade in heavy brush, as well as providing a safety factor in shielding the operator and others from the rotating saw blade and scythe tips, and matter flung thereby.

3 Claims, 4 Drawing Figures

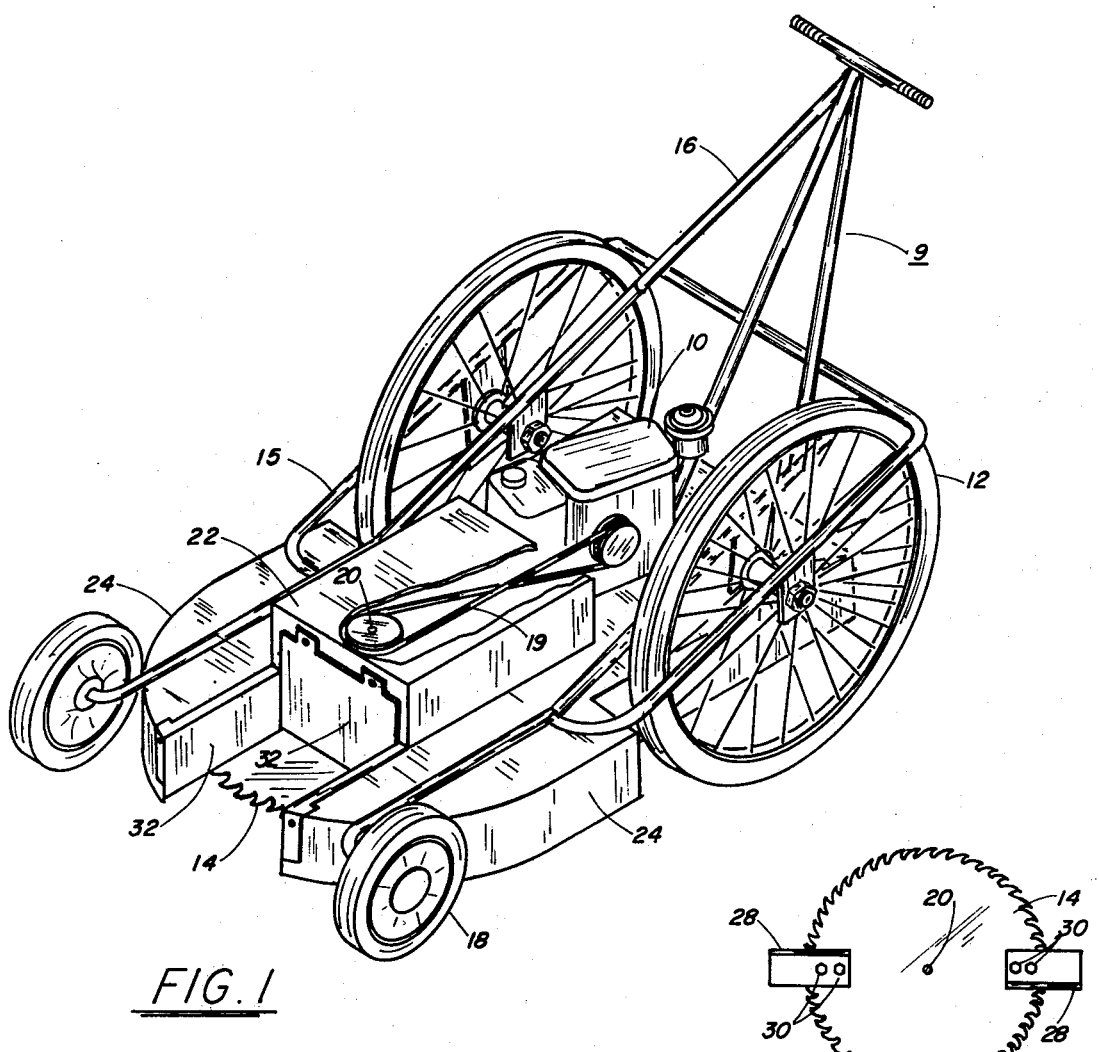

LAWN MOWING BRUSH CUTTER

This is a continuation-in-part of my pending application Ser. No. 645,777 filed 12/31/75 for a lawn mowing brush cutter abandoned as of the filing date accorded this continuation-in-part.

BACKGROUND OF THE INVENTION

1. Field of the Invention

The invention relates generally to cutters and lawn mowers and more particularly to a lawn mowing brush cutter.

2. Description of the Prior Art

The latest art, Geist et al. U.S. Pat. Nos. 3,708,967 and 3,826,068 teach lawn mowing by means of swinging wires with no brush cutting capabilities. Brush cutting prior art, Roy et al. U.S. Pat. No. 2,722,955 teaches a sling carried rotating saw blade on a handle for sythe-like use. Wood, U.S. Pat. No. 3,690,051, teaches centrifugally operable blade tips for mowing grass, as does Goserud, U.S. Pat. No. 3,715,874, which adds a cammed action with a scalloped base plate to push loose uncuttable items out of range of a retracted blade. Wheel traction grass mowers cut grass with toothed cutters by superimposing circular blades, one over the other with stationary fingers guiding the strands therebetween for clipping, as in Hurley, U.S. Pat. Nos. 1,110,058, or as in Lee, 2,504,268 where the cutters are arranged tangentially and in Kelsey, 2,625,784 where a larger plurality of cutters are used in linear arrangement without stationary upper saw teeth. A single saw-toothed cutter is also traction driven without opposing teeth as taught in Harwell, U.S. Pat. No. 2,202,774 and can be considered inoperable to cut grass unless power driven to obtain a necessary speed of rotation. All the above do not teach a recessed saw blade, the recess sides being employed as guides and a stabilizer. The only brush cutter is different in structure, function and result to such an extent that the invention is not even suggested.

SUMMARY OF THE INVENTION

An object of the invention is to provide a machine for brush cutting and with a slight manual modification for lawn mowing.

Another object of the invention is to provide a machine that is safe to operate on rocky ground and that is self stabilizing in operation.

BRIEF DESCRIPTION OF THE DRAWINGS

FIG. 1 is a perspective view of the invention with partial covering cut away;

FIG. 2 is a plan view of the saw blade with scythe blades;

FIG. 3 is a partial perspective view of the front of the invention rigged as a brush cutter; and FIG. 4 is partial perspective view as in FIG. 3 with the machine rigged as a lawn mower.

DETAILED DESCRIPTION

Referring to FIGS. 1 and 2, the invention comprises a four-wheeled cart 9, a power supply 10 mounted on said cart between rear wheels 12, and a circular saw blade 14 mounted forwardly on cart 9 and connected to power supply 10 for being horizontally driven in rotation thereby above the surface on which the wheels rest.

Cart 9 comprises a chassis 15 supported on large rear wheels 12 that support the weight of power supply 10 and a rearwardly extending handle 16 that is used to manually propel and direct the cart. Front wheels 18 support the front of the cart and saw blade 14, partially, said wheels being smaller than the rear wheels for ease in raising from the ground in changing direction of the cart by depressing the handle 16.

Power supply 10 is a small internal combustion engine that is adapted to drive a belt 19 connecting the power supply to drive a vertical shaft 20 on which saw blade 14 is horizontally mounted forwardly on the cart with respect to said power supply but rearwardly of front wheels 18. A protective belt cover 22 shields the belt from external interference and restricts it in case of breakage. Base 24 is fixed to chassis 15 to protect blade 14.

Referring to FIGS. 3 and 4, removable recess adapter 32 and recess cover 34 are provided for use in cutting brush and cutting grass respectively. Recess adapter 32 provides an insert that defines a recess in the front of the cart ahead of saw blade 14. The recess guides brush into cutting engagement with said saw blade, stabilizes the front end of the cart when cutting brush and shields the sides of the saw blade against casual engagement with foreign matter as a matter of safety. Bolts 36 hold recess adapter 32 in place by engaging in screw threads defined in the cart.

When grass is to be mowed, scythe tips 28 are diametrically bolted to saw blade 14 after recess adapter 32 has been removed from the cart. The recess cover 34 is then secured to base 24 by bolts 36. No recess is defined by recess cover 34 and the scythe tips 28 mow a wider swathe of grass that does not require the assistance of a recess for stabilizing the front end of the cart.

The conversion from brush cutting to grass mowing is effected easily and in a minimum length of time by the removal of two pairs of bolts and a recess adapter 32, and adding a pair of scythe tips 28 to saw blade 14 by means of bolts 30' and protective cover 34 by means of the same two pair of bolts 36 that were removed with said recess adapter 32. Reversing this process places the apparatus in its original condition for original use.

What is claimed is:

1. A lawn mowing brush cutter comprising in combination:
   a. a cart having a base with a forward center recess, a pair of small front wheels, a pair of large weight carrying rear wheels, and a rear handle for propelling and guiding said cart by said large wheels;
   b. a power supply mounted on said cart between said pair of weight carrying rear wheels and forwardly of said rear handle;
   c. dual purpose cutter means horizontally mountable on said cart and in said base and between said front wheels and said power supply for rotation by the power supply to cut swathes of brush and grass defined by the forward center recess in said base;
   d. a single purpose mowing means mountable on said dual purpose cutting means in radial extension thereof and in combination therewith for mowing a wider swathe of grass than said dual purpose cutter means; and
   e. base adapter means including (1) a removable cover means for covering said forward center recess to make said base continuous and permitting said dual purpose cutter means and said single purpose cutter means to cut grass and (2) a removable recess member positionable within said forward center recess and cooperable with said dual purpose cutter means to establish and cut mowing swathes.

2. A lawn mowing brush cutter as described in claim 1 wherein said dual purpose cutter means comprises: p1 a. a circular saw blade mounted forwardedly in said cart for horizontal rotation; and p1 b. said removable recess member extends partially ahead of and above the forward portion of said saw blade for guiding brush into cutting engagement therewith, for establishing brush cutting swathe widths, and for shielding side and rear portions of said circular saw blade.

3. A lawn mowing brush cutter as described in claim 1 wherein said single purpose cutter means comprises: p1 a. a pair of scythe tips diametrically and removably mounted under and to said dual purpose cutting means in radial extension thereof; and p1 b. said removable cover means cooperates with said base for completely shielding said dual purpose cutter means with scythe tips thereon from all sides and above.

* * * * *